July 1, 1941.  R. T. ZWACK  2,248,030
MOTION TRANSMITTING MECHANISM
Original Filed Sept. 15, 1936
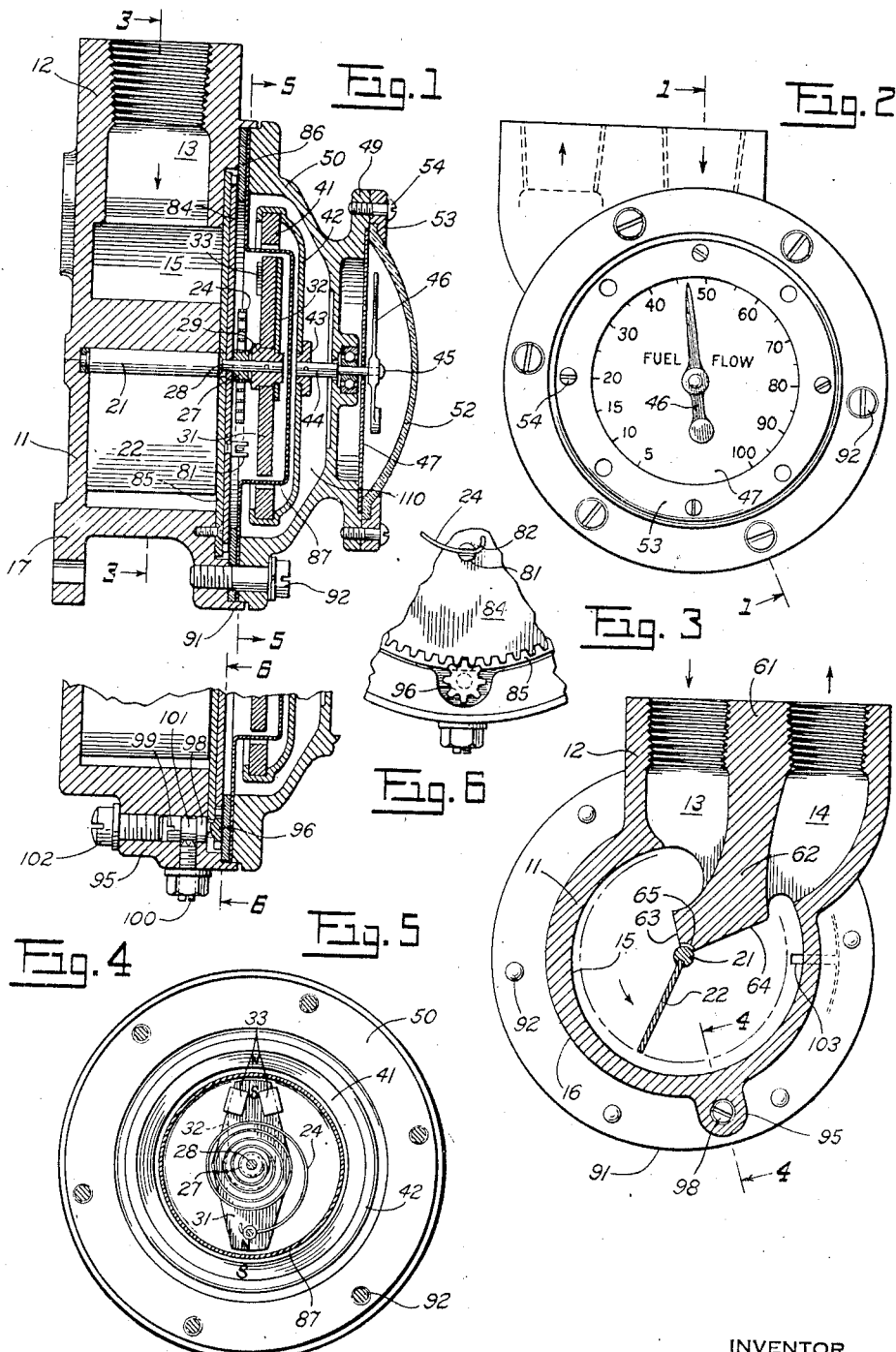
INVENTOR.
Raymond T. Zwack
BY
Martin J. Finnegan
ATTORNEY.

Patented July 1, 1941

2,248,030

UNITED STATES PATENT OFFICE 2,248,030

MOTION TRANSMITTING MECHANISM

Raymond T. Zwack, East Orange, N. J., assignor to Eclipse Aviation Corporation, East Orange, N. J., a corporation of New Jersey Application December 7, 1938, Serial No. 244,453 which is a division of Serial No. 100,953, September 15, 1936. Divided and this application April 25, 1939, Serial No. 270,009

1 Claim. (Cl. 172—284)

This invention relates to driving mechanism, and particularly to driving mechanism for transmitting motion between driving and driven elements which are separated by a fixed element, such as a fluid seal, wherefore mechanical coupling of the parts is not feasible.

This application is a division of my application No. 244,453, filed December 7, 1938, which in turn is a division of my application No. 100,953 filed Sept. 15, 1936 wherein will be found claims to a flowmeter in which is incorporated the driving mechanism herein claimed. The present specification includes the complete flowmeter, by way of explaining more clearly the utility of the invention herein claimed; but it is to be understood that the invention herein claimed may be used in other settings with equal efficacy.

An object of the invention is to provide a novel magnetic motion transmitting mechanism suitable for use wherever motion transmission is desirable, and of particular advantage in connection with the transmission of motion between parts on opposite sides of a closure or sealing element which precludes direct mechanical coupling therebetween.

A second object is to provide a magnetic coupling consisting of two elements, one encircling the other and each having but a single set of magnetic poles, with the poles of the encircled element located at opposite ends thereof, and the poles of the encircling element located at diametrically opposed points thereon whereby the magnetic flux flows in two semi-circular paths from one of said poles to the other, with each semi-circular path free of interfering air gaps or other extraneous obstructions.

These and other objects of the invention will become apparent from inspection of the following specification when read with reference to the accompanying drawings wherein is illustrated the preferred embodiment of the invention. It is to be expressly understood, however, that the drawings are for the purpose of illustration only, and are not designed as a definition of the limits of the invention, reference being had to the appended claim for this purpose.

In the drawing:

Fig. 1 is a central sectional view of a device embodying the invention;

Fig. 2 is a view in elevation from a viewpoint to the right of Fig. 1 but on a slightly reduced scale;

Fig. 3 is a transverse sectional view along the line 3—3 of Fig. 1;

Fig. 4 is a sectional view along the line 4—4 of Fig. 3;

Fig. 5 is a sectional view along the line 5—5 of Fig. 1; and

Fig. 6 is a view of some of the parts shown in Fig. 4 but viewed along the line 6—6 of Fig. 4.

These six figures collectively show the preferred embodiment of the invention as including a main casting 11 having an upper portion 12 through which may be connected a pair of closed conduits or pipes one of which will have threaded connection with the inlet port 13 and the other of which will have threaded connection with the outlet port 14 of the fluid receiving chamber 15 which, as shown, is formed eccentrically of the center line of the outer wall 16 of the casting, which center line is also the center of the flange 17, which provides for the support of the unit on supporting wall not shown, and is also the center line of a rockshaft 21 to which is releasably secured in any suitable manner a vane 22 adapted to be actuated in a counterclockwise direction, as viewed in Fig. 3, by the contact therewith with the incoming fluid and in a clockwise direction by the action thereon of a spirally wound spring 24 shown in Figs. 1 and 5, the said spring having its inner end fixed to a sleeve 27 which in turn is adapted to rotate with the shaft 28 which constitutes an extension of the above described shaft 21. It will be noted that passages 13 and 14 are separated by a dividing wall 61 having an extension 62 with plane-surfaced sides 63, 64 terminating in a concave cylindrical surface 65 about which rockshaft 21 rotates as the vane 22 swings from wall surface 63 toward surface 64. In other words, these sides 63, 64 act as abutments to mark the limits of the range of movement of the vane 22, thus preventing movement of the said vane beyond that portion of the chamber 15 through which fluid flow is accurately measurable. Integrated with the said shaft 28 is a second sleeve or hub 29 of an elongated magnetic plate 31 the said magnetic plate 31 being held to the hub 29 preferably by the intermediary of a clamping plate 32 of suitable material not necessarily the same as and preferably different from that of the magnetic plate 31. As shown best in Fig. 5 the plate 32 has a plurality of fingers 33 adapted to extend over and grip the magnetic plate 31 near one outer end thereof; and near its opposite end said clamping plate 32 is apertured to extend over and have a driving fit with the hub 29 whereby rotation of hub 29 produces a corresponding rotation of the magnetic plate 31. Adapted to cooperate with this magnetic rotor 31 is a one-piece annular magnetic element 41 preferably of the same material and of similar magnetic characteristics, the said annular element 41 being suitably held in a second rotor 42 having a hub 43 secured to the inner portion 44 of a rotatable pointer shaft 45 on which is secured the index element 46 movable across the face of a dial 47 held in place within the outer portion 49 of the smaller casting 50 by suitable means which as shown includes a transparent cover or window 52, a retaining rim 53 and fastening screws 54.

The outer end of the spiral spring 24 is adjustably held by suitable means which as shown includes a yoke or detent 81, Figs. 1 and 6, to receive the hooked end 82 of the spring 24, the said detent being riveted in a toothed plate 84, held between a plate 85 fastened to the casting 11 on the one hand, and an annular plate 86 which, together with the cup-shaped element 87, is clamped to the wall of the casting 11 when the smaller casting 50 is mounted in place within the piloting rim 91 of the large casting, the whole assembly being secured in this relationship by the action of the fastening screws 92. Intermediate fastening screws 92 the casting 11 is provided with a radially extending boss 95 to receive the means for adjusting the setting of the spiral spring 24. As shown this means includes a pinion 96 or its equivalent adapted to register with notches or teeth on the spring detent carrying plate 84 as indicated in Figs. 1 and 4 and thereby adapted to vary the position of the said detent and hence the tension in the spring in response to movement of said pinion 96. This movement is preferably effected by providing a cylindrical extension on the pinion 96 in the form of a shaft 98 journaled in the boss 95 and slotted at its outer end as indicated at 99 to receive a suitable key by which it may be turned, the shaft being held in its adjusted position before and after such turning by action of the set screw 100 upon the portion 101 of reduced diameter. If desired the opening in the boss 95 may be closed by any suitable means such as the screw shown at 102.

To facilitate movement of plate 84 by the pinion 96, there is provided a radial port 103 (Fig. 3) in plate 85 through which fluid may pass from the chamber 15, and form a lubricating film on the surfaces of plate 84, and the adjacent surfaces of parts 85 and 86; while cup-shaped element 87 acts to seal the inner chamber from the outer chamber 110, so that no fluid escapes into the latter.

The inter-position of the cup-shaped element 87 (being non-magnetic) does not prevent the two magnetic rotors 31 and 42 from establishing a field of magnetic reaction therebetween; hence the outer rotor 42 becomes magnetically unbalanced upon, and to the extent of, any movement of the inner rotor 31 in relation to the rotor 42. Therefore, any rotary movement of the inner rotor 31 results in a corresponding rotary movement of the outer rotor 42 and hence a displacement of the pointer 46 accordingly. Such rotary movement will, of course, be produced to an extent dependent upon the relationship between the two forces acting upon the vane 22 in the chamber 15, the said two forces being on the one hand the pressure of the fluid upon the surface of the vane as it seeks to escape to the outlet 14 by way of the clearance between the outer edge of the vane and the inner wall of the chamber, and on the other hand by the force exerted in an opposite direction upon the shaft 21 by the tensioned spring 24, the said force being adjustable (by turning pinion 96) to suitably calibrate the instrument in the manner above described. The pressure exerted by the fluid upon the vane 22 will in turn be proportional to the rate of flow through this clearance area beyond the outer edge of the vane 22, which area (as above indicated) varies in proportion to the degree of eccentricity of the chamber.

What I claim is.

In a device of the character described, the combination of a driving means, a magnetized bar movable about its own center in response to movement of said driving means, and means to indicate the extent of movement of said bar about its center, said indicating means including a one-piece magnetized ring of uniform thickness movable in synchronism with said bar, in encircling, co-planar relationship thereto, such movement being governed by a single pair of magnetic poles, from one of which poles magnetic flux flows in two diverging paths through said ring, and at the other of which poles the two paths unite, to return to said first-named pole by way of the intervening magnetized bar.

RAYMOND T. ZWACK.